United States Patent
Ezaki

(10) Patent No.: US 8,811,368 B2
(45) Date of Patent: Aug. 19, 2014

(54) RECEPTION APPARATUS, PATH DETECTION APPARATUS, METHOD THEREOF, AND COMPUTER PRODUCT USED IN CDMA SYSTEM BASE STATION

(75) Inventor: Takato Ezaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1678 days.

(21) Appl. No.: 12/035,765

(22) Filed: Feb. 22, 2008

(65) Prior Publication Data

US 2008/0205367 A1 Aug. 28, 2008

(30) Foreign Application Priority Data

Feb. 26, 2007 (JP) .................................. 2007-45551

(51) Int. Cl.
*H04B 7/216* (2006.01)
*H04B 1/7073* (2011.01)
*H04B 1/7115* (2011.01)
*H04B 1/7117* (2011.01)

(52) U.S. Cl.
CPC ............ *H04B 1/7073* (2013.01); *H04B 1/7115* (2013.01); *H04B 2201/70707* (2013.01); *H04B 1/7117* (2013.01)
USPC ........................................................ 370/342

(58) Field of Classification Search
USPC .................... 370/342, 320, 335, 441, 329; 455/422.1, 450, 462, 464
See application file for complete search history.

(56) References Cited

U.S. PATENT DOCUMENTS

| | | | |
|---|---|---|---|
| 7,187,667 B1 | 3/2007 | Minowa et al. | |
| 7,444,169 B2 * | 10/2008 | Ishii et al. | 455/561 |
| 7,471,641 B2 * | 12/2008 | Moon et al. | 370/252 |
| 7,822,424 B2 * | 10/2010 | Markhovsky et al. | 455/456.1 |
| 2003/0003914 A1 | 1/2003 | Kubo et al. | |
| 2004/0029547 A1 | 2/2004 | Kakehi | |
| 2004/0125773 A1 * | 7/2004 | Wilson et al. | 370/337 |
| 2004/0136445 A1 * | 7/2004 | Olson et al. | 375/148 |
| 2004/0203405 A1 * | 10/2004 | Reial et al. | 455/65 |

FOREIGN PATENT DOCUMENTS

| | | |
|---|---|---|
| JP | 1999-220774 A | 8/1999 |
| JP | 2000-151558 | 5/2000 |
| JP | 2000-151558 A | 5/2000 |
| JP | 2002-359591 A | 12/2002 |
| JP | 2003-298468 A | 10/2003 |

OTHER PUBLICATIONS

De Gaudenzi, R.;"Direct-sequence spread-spectrum chip tracking in the presence of unresolvable multipath components"; Issue Date: Sep. 1999; vol. 48; pp. 1573-1583.*

(Continued)

*Primary Examiner* — Thai Nguyen
(74) *Attorney, Agent, or Firm* — Myers Wolin, LLC

(57) ABSTRACT

A reception apparatus used by a Code Division Multiple Access (CDMA) system base station includes a path detection unit performing path detection on a selected user equipment. Also included is a deriving unit using the detected path timing to despread incoming signals from said selected user equipment and deriving one or more multipath components. Also included is a providing unit Rake combining said one or more multipath components to provide a demodulation signal. Also included is a scheduling unit selecting one or more user equipments at predetermined intervals according to one or more judgment criteria and reporting to the path detection unit. The one or more judgment criteria includes criteria for selecting the user equipment with the demodulation signal which has a higher fading frequency.

15 Claims, 8 Drawing Sheets

(56) References Cited

OTHER PUBLICATIONS

European Search Report, European Patent Office, European application No. EP 08 10 1954, Jun. 12, 2008.

European Patent Office, Communication pursuant to Article 94(3) EPC for corresponding European Patent Application No. 08 101 954.9, dated Sep. 8, 2009.

* cited by examiner

FIG. 5

| FADING FREQUENCY (Hz) | EVALUATION VALUE (ms) |
|---|---|
| 0-80 | 200 |
| 80-160 | 100 |
| 160-320 | 50 |
| 320 OR MORE | 30 |

FIG. 7

| CARRIER FREQUENCY SHIFT(Hz) | EVALUATION VALUE(ms) |
|---|---|
| LESS THAN 300 | 0 |
| 300 OR GREATER | 10 |

FIG. 8

| VARIANCE OF RECEPTION SIR | EVALUATION VALUE(ms) |
|---|---|
| LARGE | 30 |
| SMALL | 200 |

RECEPTION APPARATUS, PATH DETECTION APPARATUS, METHOD THEREOF, AND COMPUTER PRODUCT USED IN CDMA SYSTEM BASE STATION

CROSS REFERENCE TO RELATED APPLICATIONS

This application is related to and claims priority to Japanese Patent Application No. JP 2007-045551, filed on Feb. 26, 2007, in the Japan Patent Office, and incorporated by reference herein.

BACKGROUND

1. Field

The embodiments generally relates to the technical field of mobile communication, and more particularly relates to a reception apparatus, path detection apparatus, method thereof, and computer product used in a Code Division Multiple Access (CDMA) system base station.

2. Description of the Related Art

In a CDMA mobile communication system, the transmission signal is encoded as error correcting code and data modulated, and is then spread by a spreading code sequence and transmitted wirelessly. As the transmission signal propagates through a broad-band wireless link to the receiving party the signal is affected by planimetrical features or buildings. At the receiving party the signal is despread, is divided into one or more multipath components, then these components are Rake combined. The Rake combined signal is data demodulated, the error correcting code is decoded, then the transmission signal is restored. The path timing, which is the time at which each of the one or more multipath components reaches a receiver, differs depending on the condition of the wireless link. Therefore, by performing path detection, the receiver must be able to maintain the most recent value of the path timing for the signal from the transmitter. Particularly, Base Transceiver Stations (BTS) which communicate with a large amount of User Equipment (UE), must perform such path detection with each of the user equipment. The calculation load of path detection is significant, so the path detector accounts for a relatively large portion of the reception part. Performing path detection to increase the update frequency (priority) of the user equipment to which a new communication channel is trying to be established is set forth in Japanese Laid-Open Patent Publication No. 2000-151558. Hereinafter, Base Transceiver Stations are also referred to as BTS and User Equipment is also referred to as UE.

In view of the prior art it would be advantageous to address the problem of moderating the update frequency of the path timing for each of the user equipment used when rake combining is performed at a CDMA system base station.

SUMMARY

According to an aspect of the embodiment, a reception apparatus used by a Code Division Multiple Access (CDMA) system base station includes a path detection unit performing path detection on a selected user equipment. Also included is a deriving unit using the detected path timing to despread incoming signals from the selected user equipment and deriving one or more multipath components. Also included is a providing unit Rake combining the one or more multipath components to provide a demodulation signal. Also included is a scheduling unit selecting one or more user equipment at predetermined intervals according to one or more judgment criteria then reporting to the path detection unit. The one or more judgment criteria includes criteria for selecting the user equipment with the demodulation signal which has the higher fading frequency.

BRIEF DESCRIPTION OF THE DRAWINGS

FIG. 5 is a chart showing one correlation between the fading frequency and the evaluation value.

FIG. 7 is a chart showing one correlation between the carrier frequency offset and the scheduling evaluation value.

FIG. 8 is a chart showing one correlation between the variance of reception SIR and the scheduling evaluation value.

DETAILED DESCRIPTION OF THE PREFERRED EMBODIMENTS

Figure 1:
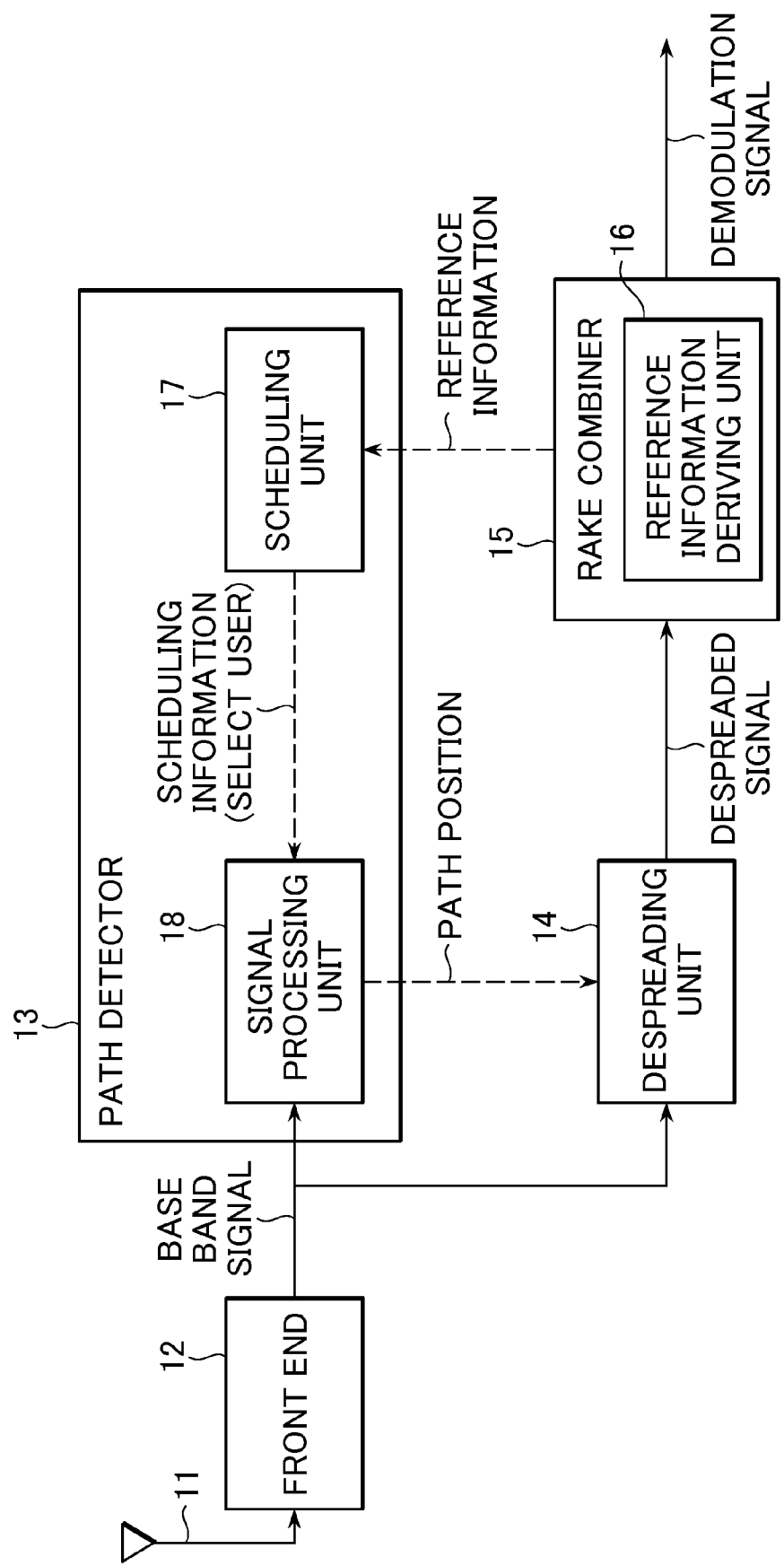
FIG. 1 illustrates a reception part of a base station according to an embodiment.

This disclosure describes the best mode or modes of practicing the invention as presently contemplated. It is important to note that these embodiments are only examples to advise one of ordinary skill in the art of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the various views of the drawings, like reference characters designate like or similar parts.

There are a variety of communication conditions that affects user equipment which exists in a cell, so the update frequency of path timing required to ensure quality differs for each user equipment. As the performance of user equipment comprising mobile terminals and stationary terminals increases and service diversifies, users moving at various speeds is also increasing. For users moving quickly, the channel status fluctuates by the second, so from the viewpoint of ensuring quality, updating path timing at a higher frequency is preferred. On the other hand, the channel status of users who are not moving at a high rate of speed will change relatively little, so less frequent updating of the path timing is acceptable. However, if path detection was to be performed at a uniformly high frequency for all user equipment regardless of the rate of movement, concern arises regarding increased calculation load of the path detector and increased circuit size because for users who are moving at a slow rate of speed or are stationary there would be resulting unnecessary calculations being performed.

For the sake of explanation, the present invention is divided into a few embodiments, but the division of the embodiments herein does not constitute a division of the present invention. Two or more embodiments may be used as necessary.

In one modality of the embodiment, a path detector in base station is used by multiple users in a time-sharing system. The base station has a unit storing for each user the time at which the last path detection was performed then calculating the elapsed time from that time, and a unit measuring the fading frequency of each user. A user with a high fading frequency is believed to be moving at a high rate of speed. The base station has a scheduling unit selecting one or more users for whom path detection will next be performed according to one or more predetermined judgment criteria. The scheduling unit selects the user with the longer elapsed time or the higher fading frequency.

One or more of the predetermined judgment criteria may include a criterion wherein the user equipment with the higher Doppler frequency shift is selected. This is because when a carrier frequency offset exceeds a certain level, this frequency shift is believed to be attributed to Doppler frequency shift resulting from a user's high-speed motion. When communication is performed under high visibility conditions, the effect of multipath fading decreases and it may become difficult to discern a user's mobility by the fading frequency alone. Even in such cases, taking the Doppler frequency shift into account makes it possible to gain a firm grasp on the mobility of a user.

FIG. 1 shows an antenna 11, a front end unit 12, a path detector 13, a despreading unit 14, and a rake combiner 15. A reference information derivation unit 16 is also shown inside the rake combiner 15. A scheduling unit 17 and a signal processing unit 18 are also shown inside the path detector 13.

The front end unit 12 performs, on a wireless reception signal received via the antenna 11, a process such as power amplification, frequency conversion, band limiting, or digital-analog conversion, and outputs a base band signal.

The path detector 13 detects the path timing to each user equipment.

The despreading unit 14 uses the path timing detected by the path detector 13 and uses the spreading code sequence of each user equipment to despread the reception signal. The despread signal includes multiple multipath components which arrive at different times.

The Rake combiner 15 Rake combines the multiple multipath components and prepares the signal for demodulation and decoding.

The reference information derivation unit 16 derives the reference information from the rake combined signals. The reference information may express a variety of content like that explained hereinafter. For example, the reference information expresses the fading frequency of the demodulation signal. This fading frequency may be derived by measuring the time cycle at which the demodulation signal fluctuates. Generally, the faster a user moves, the higher the fading frequency. Note, the reference information derivation unit 16 is shown as a part of the rake combiner 15, but the reference information derivation part 16 may be provided separately from the rake combiner 15.

The scheduling part 17 outputs scheduling information based on the reference information. Scheduling information specifies which user equipment path should be detected during the next path detection.

Figure 2:
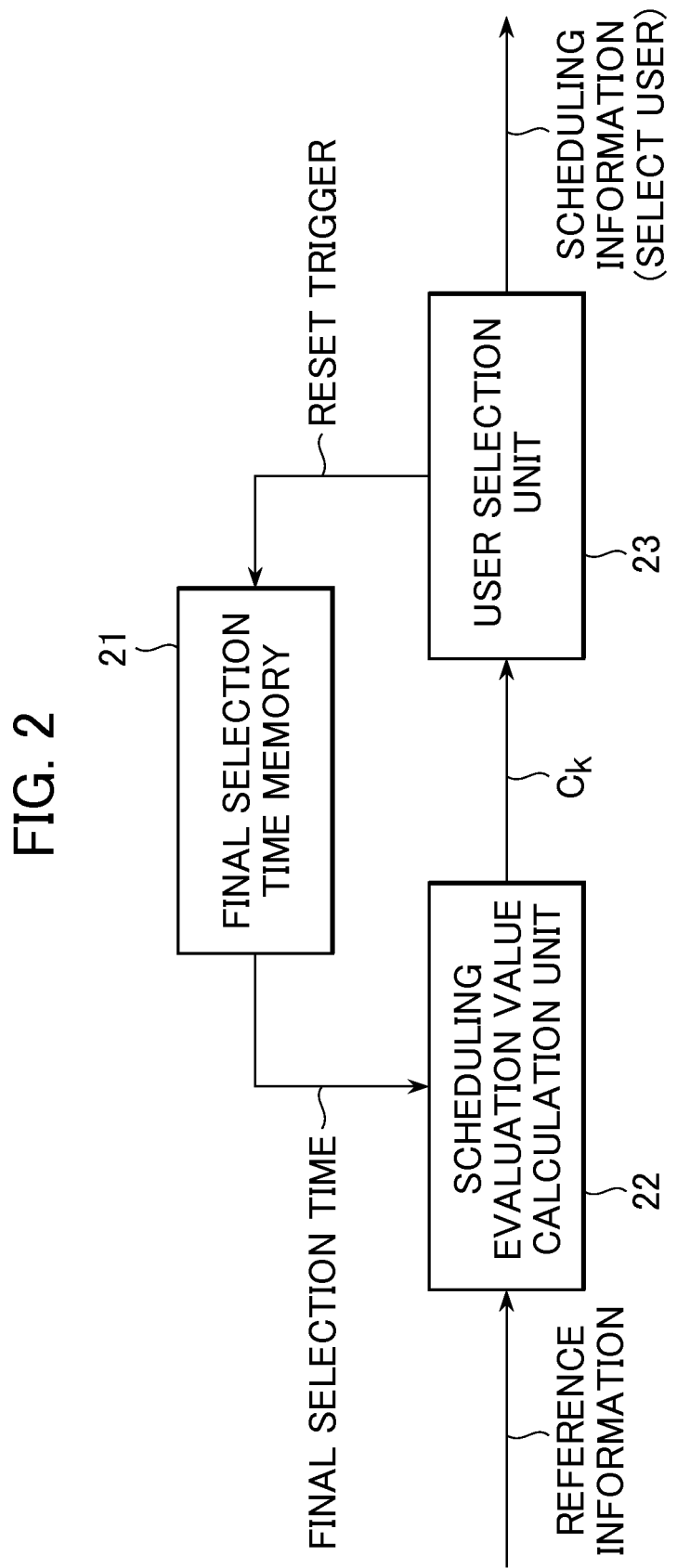
FIG. 2 is a detailed view of the scheduling unit shown in FIG. 1.

FIG. 2 shows memory 21, a scheduling evaluation value calculation unit 22, and a user selection unit 23.

Memory 21 stores the final selection time for each user equipment. The final selection time corresponds to the previous time when a user equipment was selected for path detection. The elapsed time, which is calculated by subtracting the final selection time from the current time, expresses the period during which the path timing has not been updated.

The scheduling evaluation value calculation unit 22 calculates the scheduling evaluation value based on the elapsed time and the reference information. As explained below, the scheduling evaluation value can be calculated by a variety of means, but can generally be expressed as the sum of the amount derived from the reference information and the amount derived from the elapsed time. The scheduling evaluation value is calculated for each user equipment.

The user selection unit 23 selects M (an integer greater than or equal to 1) user equipment with the smaller scheduling evaluation value based on the scheduling evaluation value provided for each user equipment. Which user equipment is selected is shown by the scheduling information. Regarding the selected user equipment, the final selection time thereof stored in memory 21 is reset to the current time and the elapsed time is reset to 0. The scheduling information is provided at regular intervals or at a regular frequency.

The signal processing unit 18 of FIG. 1 detects the path position of the incoming signal from the user equipment which was specified by the scheduling information.

Figure 3:
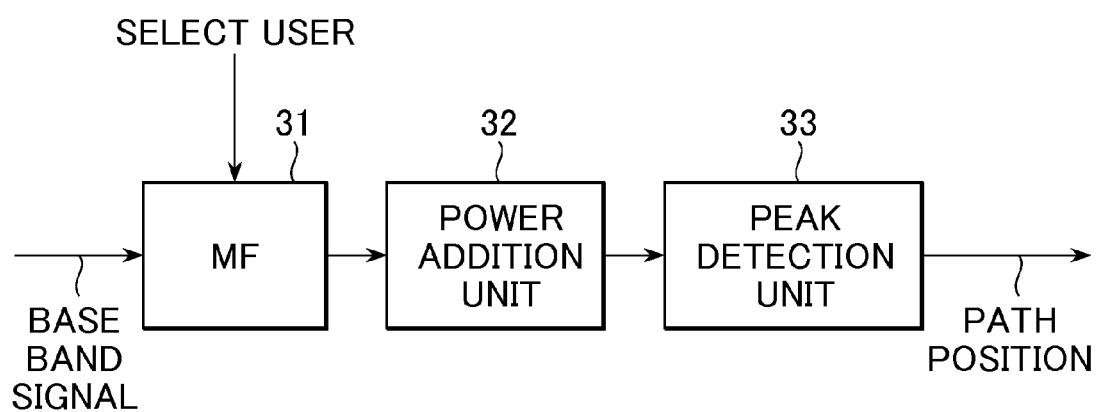
FIG. 3 is a detailed view of the signal processing unit shown in FIG. 1.

FIG. 3 shows a matched filter (MF) 31, a power addition unit 32, and a peak detection unit 33.

The matched filter (MF) 31 calculates the correlation value between the spreading code sequence for the specified user equipment and the base band signal.

The power addition unit 32 adds the correlation value in phase, then derives the power profile.

The peak detection unit 33 detects the peak position which exceeds the threshold in the power profile, then outputs the information which specifies the peak position as the path position or the path timing.

Figure 4:
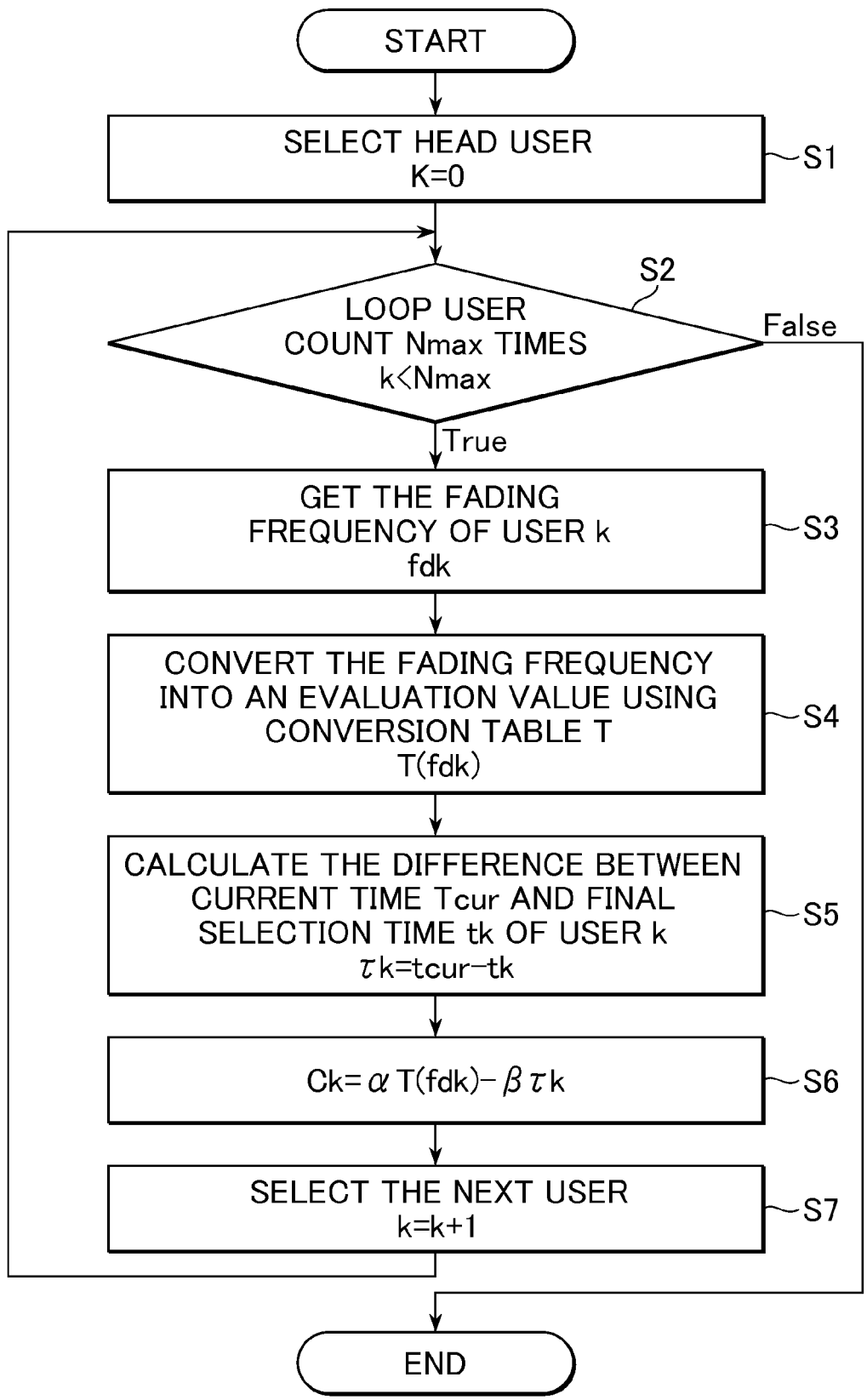
FIG. 4 is a flowchart for calculating the scheduling evaluation value.

The flow chart in FIG. 4 illustrates an example method for preparing the scheduling evaluation value Ck for each of the Nmax number of user equipment. The symbols used in this exemplary operational explanation shall be defined as follows below.

k: User number
Nmax: Maximum number of users
fdk: Fading frequency of user k
tcur: Current time
tk: Previous path update time for user k
Tk: Elapsed time from the previous path update of user k
T(fd): Required path update period for fading frequency fd
α: Evaluation weighting of the fading frequency
β: Evaluation weighting of the elapsed time from the previous path update
Ck: Scheduling evaluation value of user k In step S1, a certain user is selected as the head user. Which user is the head user is not important. The head user number is set k=0

In step S2, whether or not the scheduling evaluation value was calculated for all users is confirmed. If all calculations are complete, the flow ends, but if users exist for whom the scheduling evaluation value was not calculated, the flow proceeds to step S3.

In step S3, fading frequency fdk of user k is provided. As explained above, the fading frequency is obtained from the reference information derivation unit 16 in FIG. 1 as the reference information.

In Step S4, fading frequency fdk is converted into a certain evaluation value T(fdk).

When the fading frequency in the time domain shown in FIG. 5 is high, the user is most likely moving at a high rate of speed. Therefore, in this case, the path timing may be frequently updated. Conversely, if the fading frequency in the time domain is low, then the user is expected to not be moving at a high rate of speed. Therefore, in this case, the path timing does not need to be frequently updated. In the illustrated example, the evaluation value is provided in the format of table T (see FIG. 5) according to the fading frequency of the time domain estimated by the reference information derivation unit 16. Also, more or fewer numerical ranges for dividing the fading frequencies and more or fewer corresponding evaluation values can be provided according to the application as can be envisioned by one skilled in the art. The correlation between the fading frequency fdk and the evaluation value T(fdk) can be provided in a table format or can be calculated according to some function on a case-by-case basis.

In step S5, elapsed time τk for user k from the previous path timing update point tk to the current point τ cor is calculated using the following equation.

$$\tau k = \tau cor - tk$$

In step S6, scheduling evaluation value Ck for user k is calculated by combining the evaluation values calculated in step S4 and step S5 according to the following equation.

$$Ck = \alpha T(fdk) - \beta \tau k$$

α and β here are the appropriate coupling coefficient or weight coefficient and in the example are set as positive numbers (α>0, β>0). Therefore, the scheduling evaluation value is provided to take a smaller value as the fading frequency gets higher and the elapsed time τk gets longer. As explained hereinafter, the upper M user with a smaller scheduling value is selected by the user selection unit 23, and the path timing is updated. This is because as the user moves at a higher rate of speed, the fading frequency becomes higher, and as the elapsed time gets longer, the path timing is more likely to change. Specific values for coupling coefficients α and β can be appropriately determined by simulation or can be determined empirically.

In step S7, parameter k which specifies the user is incremented, the flow returns to step S2, then the explained procedure reiterates until scheduling evaluation values are provided for all users.

Figure 6:
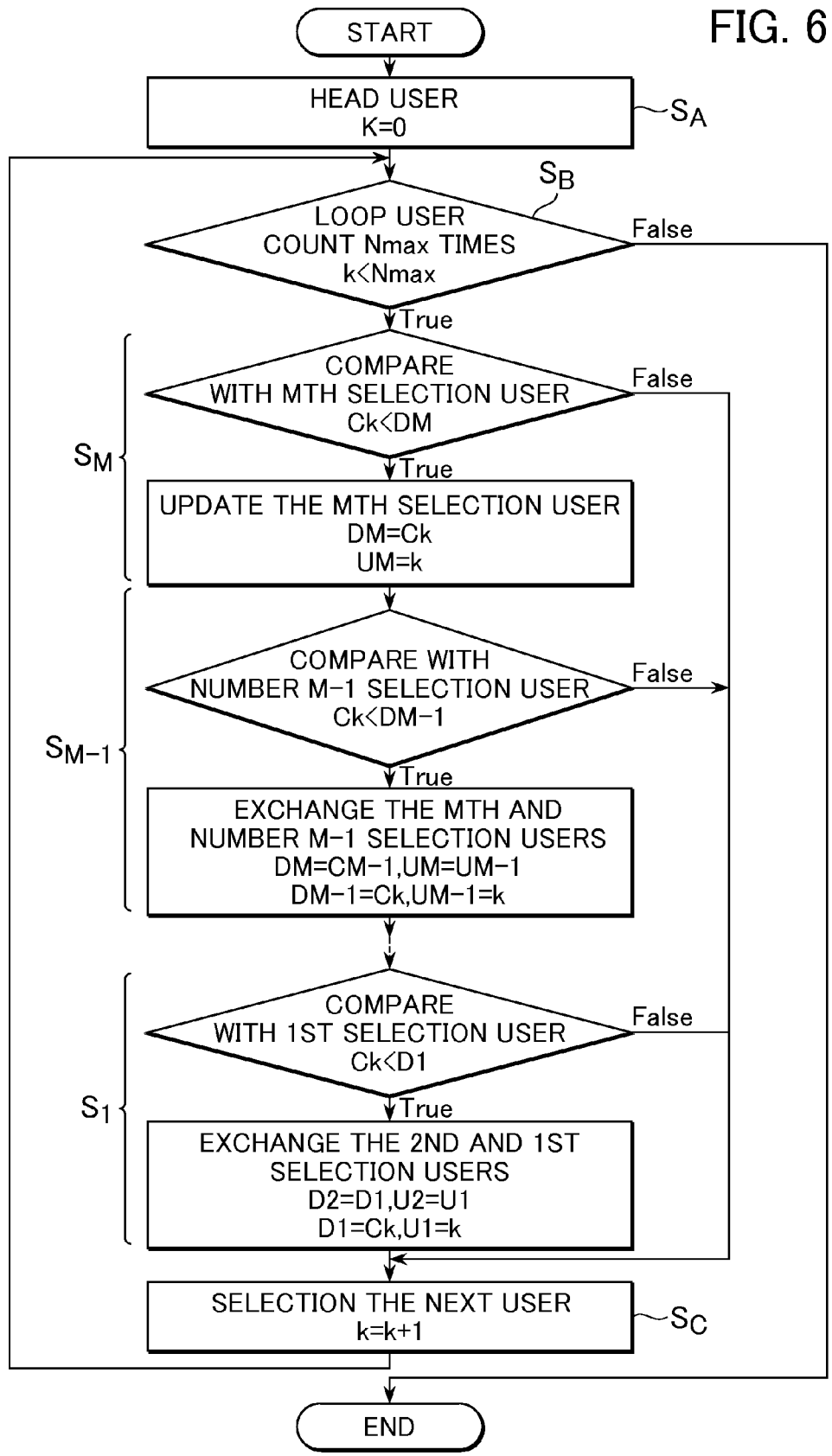
FIG. 6 is a flowchart for selecting the upper M user with a small scheduling evaluation value.

The signal processing unit 18 in FIG. 1 performs path detection on the maximum Mth user at a certain uniform period. The M number of user equipment is specified by the scheduling information. The flow chart in FIG. 6 is used for selecting an M number of users in descending order of Nmax count scheduling evaluation value Ck. The symbols used in this exemplary operational explanation shall be defined as follows below.

k: User number
Nmax: Maximum number of users
M: Maximum number of users that can be selected per period
Ck: Scheduling evaluation value of user k
Un: nth user number in the selection priority
Dn: Scheduling evaluation value of user Un being nth user number in the selection priority A certain user is selected as the head user in step SA. In this case as well, which user is the head user is not important. The head user number is set k=0

In step SB, whether or not a size comparison was performed on all scheduling evaluation values Ck is confirmed. If all comparisons are complete, the flow ends, but if all comparisons are not complete, then the flow proceeds to step SM.

In step SM, the size relationship between scheduling evaluation value Ck of user k and scheduling evaluation value DM of the Mth user of the selection order is judged. This DM is a small scheduling evaluation value which was selected by the previous loop or is the scheduling evaluation value which was the Mth smallest value of the M number of scheduling values which were initially selected. If Ck is greater than or equal to DM (Ck≥DM), then there is no way for the user with that scheduling evaluation value to be selected. Therefore, in this case the flow proceeds to step SC, the value of parameter k, which specifies the user, is incremented, and the flow returns to step SB.

If Ck is less than DM (Ck<DM), the user with this scheduling evaluation value Ck has a chance of being selected; however, it is certain that the user with scheduling evaluation value DM will be rejected. Then, the scheduling evaluation value of the user with the Mth selection order will be updated to Ck and the user number with the Mth selection order will be updated to k.

In step SM−1, the size relationship between scheduling evaluation value Ck of user k and scheduling evaluation value DM−1 of the user with the M−1 selection order is judged. If Ck is greater than or equal to DM−1 (Ck≥DM−1), it is determined that the order of Ck at the current time is truly the Mth position. Therefore, in this case, the flow proceeds to step SC, the value of parameter k, which specifies the user, is incremented, and returns to step SB. If Ck is less than DM−1 (Ck<DM−1), the selection order of that scheduling evaluation value Ck is M−1 or less (higher than M), and it is determined that the selection order of scheduling evaluation value DM−1 at the current time has fallen to the Mth position. Then, the content of selection order M and M−1 is swapped. Specifically, the scheduling evaluation value of the Mth user in the selection order is updated to DM−1, and the Mth user in the selection order is updated to user number M−1. Also, the scheduling evaluation value of the user with selection order M−1 is updated to Ck, and the user number of selection order M−1 is updated to k.

Similar processes are reiterated below. If scheduling evaluation value Ck is the lowest value, then the flow reaches step S1, the scheduling evaluation value of the second user in the selection order is updated to D1, and the user number of the second user in the selection order is updated to 1. Also, the scheduling evaluation value of the first user in the selection order is updated to Ck and the user number of the first user in the selection order is updated to k.

In step SC, the value of parameter k, which specifies the user as explained above, is incremented and then the flow proceeds to step SB. At this point, the size relationship of all scheduling evaluation values Ck (k=1, . . . , Nmax) is judged, the upper M number with a small value is determined, and the signal processing unit 18 notifies the corresponding users from the scheduling unit 17. Then, the last selection time of the user corresponding to this M number value is updated at the time of the above notification and the last selection time stored in memory 21 is reset. The elapsed time for the M user selected here is reset to 0.

For the sake of explanation, the more time required to frequently perform path detection, the smaller the value that scheduling evaluation value Ck is determined to take and the lower the order in which the selected upper M user will be selected. However, a size relationship with reversed numbering can also be set. The more time is required to frequently perform path detection, the greater the value that scheduling evaluation value Ck is determined to take and the higher the order in which the selected upper M user will be selected. The operation flow in FIG. 6 is no more than an example, so one skilled in the art may utilize another operational flow which selects an upper M user with a lower value can also be used. Other variations may likewise be used and still be within the principles of the present invention.

As explained in the above examples, the M user was selected by calculating the scheduling evaluation value while considering the elapsed time from the previous path detection process and the fading frequency, but other additional reference information can also be tempered. In other words, scheduling evaluation value Ck is calculated using the equation $$Ck = \alpha T(fdk) - \beta \tau k + \gamma$$

and it is also acceptable for the γ portion to be tempered as explained hereinafter.

A. Doppler Frequency Shift

The incoming signal from a user equipment might be shifted away from the conventional frequency. Carrier frequency offset such as this are caused by shifting of the oscillation frequency in the oscillator which is mounted in the terminal or are caused by the effect of Doppler shift resulting when waves are directly received from a mobile terminal moving at a high rate of speed. The former can be measured to some extent according to the technical standard of the system. If a carrier frequency offset which exceeds an effect such as this occurs, then it could be attributed to the latter Doppler frequency shift effect. In other words, the user is moving at a high rate of speed and path detection must be frequently performed.

The Doppler frequency shift appears as a phase variation in the reception signal sample. Therefore, estimating the Doppler frequency shift by using the channel estimation result at the base station is also acceptable.

For example, by tempering the scheduling evaluation value resulting from the conversion of the estimated value of the carrier frequency offset (Hz) shown in FIG. 7 as additional reference information γ, it is acceptable to reflect in the scheduling evaluation value the fact that the path detection priority of the user for whom a carrier frequency offset greater than a certain amount is occurring should be increased.

B. Variation

The reception signal quality of signals from a user moving at a high rate of speed tends to vary greatly due to fading of the reception SIGNAL-INTERFERENCE-RATIO (SIR), for example. By measuring the variation of the reception SIR for each user and increasing the frequency of path detection for users with significant variation, the path detection frequency can be moderated. Variation can also be expressed as variance, standard deviation, or deviation, for example.

For example, if the variance of the reception SIR shown in FIG. 8 is tempered as additional reference information gamma which is the value converted into the scheduling evaluation value, it is acceptable to reflect in the scheduling evaluation value the fact that the path detection priority of the user for whom variation in the reception SIR is increasing, due to a high rate of motion, should be increased.

C. Desired Value

In signals received from users with varying path timing due to a high rate of motion, there is a tendency to deviate from target quality, which is the desired value for required signal quality. Reflecting in the scheduling evaluation value the fact that measuring the reception signal quality for each user and increasing the frequency of path detection for users who are increasingly deviating from the desired value is also acceptable. Reception signal quality can also be expressed as, for example, SIR (Signal-to-Interference power Ratio), SINR (Signal-to-Interference plus Noise power Ratio), CNR (Carrier-to-Interference power Ratio), or BLER (BLock Error Rate). Furthermore, the quality of signals received from users such that the signals are no longer synchronized degrade significantly, so these signals must be quickly resynchronized. Therefore, in some embodiments path detection priority may be preferred for the out of synchronization users to be increased.

Figure 9:
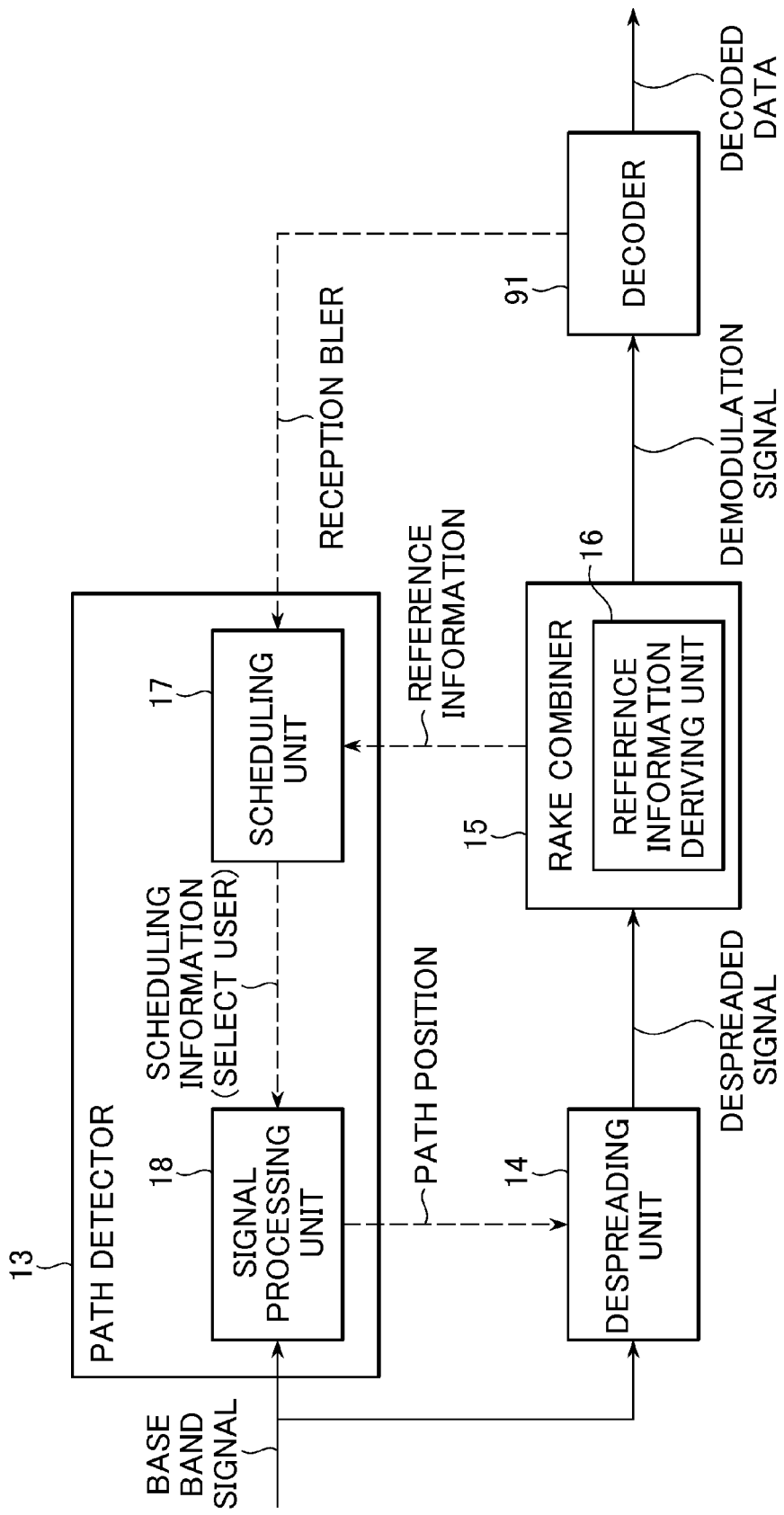
FIG. 9 is a figure showing the reception part of a base station.

In FIG. 9, a decoder 91 is added to the elements already explained in FIG. 1. The decoder 91 decodes rake combined demodulation signals, calculates BLER, then reports the reception BLER to the scheduling unit 17. The scheduling unit 17 compares the reported reception BLER to the target BLER, judges the degree of deviation from the desired value, then reflects the judgment result in the scheduling evaluation value. Similar to when the reception SIR is used, the scaling unit 17 compares the reported reception SIR to the target SIR, judges the degree of deviation from the desired value, then reflects the judgment result in the scheduling evaluation value.

D. Specific Communicating Parties

In each of the aforementioned examples, a user's path detection frequency was relatively regulated according to the communication conditions, but setting an absolutely high priority to particular communicating parties such as police stations, fire stations, and hospitals is also acceptable. Preventing disrupted communication caused by variation in the path timing from occurring by increasing the priority of path detection for users with whom such important communication is performed is preferred in certain exemplary embodiments.

E. Particular Types of Communication

A variety of communication such as audio communication and data communication can be performed by a user. High-quality transmission of audio packets or real-time data is preferred. Therefore, increasing the path detection priority of users for whom such real-time communication is imperative is preferred in certain exemplary embodiments.

F. RTT

Base stations measure the RTT (Round Trip Time) for each user either periodically or as necessary to grasp the distance to the user. Measurements such as these are important data which is necessary to provide service, so quickly and precisely taking these measurements is preferred. Therefore, increasing the path detection priority of such users who are measured is preferred in certain exemplary embodiments.

For the sake of explanation, the present invention was divided into a few embodiments, but the division of the embodiments herein does not constitute a division of the present invention. One or more embodiments may be used as necessary. More numerical ranges for dividing the Doppler frequency, carrier frequency offset, and reception SIR variance and more corresponding evaluation values can also be provided.

According to the present embodiment, moderation of the update frequency of path timing for each user equipment used when rake combining is performed at a CDMA system base station is possible.

In an embodiment, some or all of the method components are implemented as a computer executable code. Such a computer executable code contains a plurality of computer instructions that when performed by a computer result in the execution of the tasks disclosed herein. For example, a computer-readable recording medium storing therein a computer program for implementing a method for detecting path timing in a Code Division Multiple Access (CDMA) system base station. Accordingly, the computer program causes a computer to execute a path detection on selected user equipment; despreading incoming signals from the selected user equipment by using the detected path timing, and deriving one or more multipath components from the despread incoming signals; rake combining the one or more multipath components, and providing a demodulation signal; and selecting one or more user equipment at predetermined intervals according to one or more judgment criteria. The one or more judgment criteria including criteria for selecting user equipment having the demodulation signal with a higher fading frequency.

The computer executable code may be available as source code or in object code, and may be further comprised as part of, for example, a portable memory device or downloaded from the Internet, or embodied on a program storage unit or computer readable medium. The computer executable code may be uploaded to, and executed by, a machine comprising any suitable architecture. Preferably, the machine is implemented on a computer platform having hardware such as one or more central processing units ("CPU"), a random access memory ("RAM"), and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

In addition, the principles may be implemented as a combination of hardware and software and because some of the constituent system components and methods depicted in the accompanying drawings may be implemented in software, the actual connections between the system components or the process function blocks may differ depending upon the manner in which the present invention is programmed. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

All examples and conditional language recited herein are intended for pedagogical purposes to aid the reader in understanding the principles and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A reception apparatus comprising:
   a receiver that receives signals; and
   a processor configured to execute a programmed procedure including,
   a path detection process performing path detection on a selected user equipment;
   a deriving process using a detected path timing to despread incoming signals from said selected user equipment and deriving one or more multipath components;
   a providing process Rake combining said one or more multipath components to provide a demodulation signal;
   a measuring process measuring an elapsed time from a previous path detection of each of a plurality of user equipment; and
   a scheduling process selecting one or more user equipment at predetermined intervals according to one or more predetermined judgment criteria then reporting to said path detection process;
   wherein said one or more predetermined judgment criteria comprise criteria for selecting the user equipment with a demodulation signal which has a higher fading frequency, and wherein
   said one or more predetermined judgment criteria further includes criteria for selecting the user equipment having a longer said elapsed time.

2. The reception apparatus according to claim 1 wherein said one or more predetermined judgment criteria includes criteria for selecting the user equipment having a greater Doppler frequency shift.

3. The reception apparatus according to claim 1 wherein said one or more predetermined judgment criteria includes criteria for selecting the user equipment having a greater variation in reception quality of an incoming signal.

4. The reception apparatus according to claim 1 wherein said one or more predetermined judgment criteria includes criteria for selecting the user equipment having a greater shift from a desired value in reception quality of an incoming signal.

5. The reception apparatus according to claim 4, wherein said reception quality is expressed as a block error rate.

6. The reception apparatus according to claim 4, wherein said reception quality is expressed as a ratio of desired signal power in a reception signal to undesired signal power.

7. The reception apparatus according to claim 1, wherein said one or more predetermined judgment criteria includes criteria for preferentially selecting a user equipment which is out of synchronization.

8. The reception apparatus according to claim 1, wherein said one or more predetermined judgment criteria includes criteria for preferentially selecting a user equipment which communicates with a predetermined party in the system.

9. The reception apparatus according to claim 1, wherein said one or more predetermined judgment criteria includes criteria for preferentially selecting a user equipment which communicates using audio packets.

10. The reception apparatus according to claim 1, wherein said one or more predetermined judgment criteria includes criteria for preferentially selecting a user equipment which will be used to measure a round trip time (RTT).

11. A path detection apparatus comprising:
    a memory; and
    a processor that executes a procedure in the memory, the procedure including,
    a path detection process performing path detection on selected user equipment;
    a deriving process using a detected path timing to despread incoming signals from said selected user equipment and deriving one or more multipath components;
    a providing process Rake combining said one or more multipath components to provide a demodulation signal;
    a measuring process measuring an elapsed time from a previous path detection of each of a plurality of user equipment; and
    a scheduling process selecting one or more user equipment at predetermined intervals according to one or more judgment criteria and reporting to said path detection process; wherein
    said one or more judgment criteria further includes criteria for selecting the user equipment based on transmission characteristics of the transmission path, and wherein said one or more judgment criteria further includes criteria for selecting the user equipment based on having a longer said elapsed time.

12. The path detection apparatus of claim 11, wherein said transmission characteristics include the demodulation signal with a higher fading frequency.

13. A method of path detection comprising:
performing path detection on selected user equipment;
despreading incoming signals from said selected user equipment by using a detected path timing, and deriving one or more multipath components;
Rake combining said one or more multipath components, and providing a demodulation signal;
measuring an elapsed time from a previous path detection of each user equipment; and
selecting one or more user equipment at predetermined intervals according to one or more judgment criteria;
said one or more judgment criteria comprising criteria for selecting the user equipment based on transmission characteristics of the transmission path, and wherein said one or more predetermined judgment criteria further includes criteria for selecting the user equipment having a longer said elapsed time.

14. The method of claim 13, wherein said transmission characteristics include the demodulation signal with a higher fading frequency.

15. A non-transitory computer-readable recording medium storing therein a computer program for implementing a method for detecting path timing, said computer program causing a computer to execute:
path detection on selected user equipment;
despreading incoming signals from said selected user equipment by using a detected path timing, and deriving one or more multipath components;
Rake combining said one or more multipath components, and providing a demodulation signal;
measuring an elapsed time from a previous path detection of each user equipment; and
selecting one or more user equipment at predetermined intervals according to one or more judgment criteria;
said one or more judgment criteria including criteria for selecting user equipment having the demodulation signal with a higher fading frequency, and wherein
said one or more predetermined judgment criteria further includes criteria for selecting the user equipment having a longer said elapsed time.

* * * * *